United States Patent
Fukami et al.

(10) Patent No.: US 11,036,323 B2
(45) Date of Patent: Jun. 15, 2021

(54) DISPLAY DEVICE

(71) Applicant: Panasonic Liquid Crystal Display Co., Ltd., Himeji (JP)

(72) Inventors: Tetsuo Fukami, Hyogo (JP); Masahiro Ishii, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/748,168

(22) Filed: Jan. 21, 2020

(65) Prior Publication Data
US 2020/0241679 A1 Jul. 30, 2020

(30) Foreign Application Priority Data
Jan. 30, 2019 (JP) ............................. JP2019-014400

(51) Int. Cl.
*G06F 3/041* (2006.01)
*G02F 1/1343* (2006.01)
*G02F 1/1362* (2006.01)
*G02F 1/1368* (2006.01)

(52) U.S. Cl.
CPC .......... *G06F 3/0412* (2013.01); *G02F 1/1368* (2013.01); *G02F 1/13624* (2013.01); *G02F 1/134363* (2013.01)

(58) Field of Classification Search
CPC .. G02F 1/13624; G06F 1/1368; G06F 3/0412; G06F 3/0416

USPC .................................................. 345/173, 174
See application file for complete search history.

(56) References Cited

U.S. PATENT DOCUMENTS

| | | | | |
|---|---|---|---|---|
| 7,532,265 | B2 * | 5/2009 | Tsai ..................... | G02F 1/13454 349/40 |
| 8,988,627 | B2 * | 3/2015 | Tae ......................... | H01L 22/32 349/54 |
| 9,240,361 | B2 * | 1/2016 | Zhang ................. | H01L 27/1262 |
| 2013/0215354 | A1 * | 8/2013 | Yoon ..................... | G02F 1/1368 349/46 |
| 2016/0188063 | A1 | 6/2016 | Kim | |

* cited by examiner

*Primary Examiner* — Calvin C Ma
(74) *Attorney, Agent, or Firm* — Hamre, Schumann, Mueller & Larson, P.C.

(57) ABSTRACT

A display device comprising: a plurality of source lines extending in a first direction; a plurality of gate lines extending in a second direction intersecting the first direction; a plurality of pixel electrodes arrayed in the first direction and the second direction; a plurality of common electrodes disposed corresponding to a plurality of touch regions arrayed in the first direction and the second direction, the plurality of common electrodes being disposed while opposed to the plurality of pixel electrodes; a plurality of sensor electrode lines electrically connected to the plurality of common electrodes; a plurality of inspection signal lines electrically connected to the plurality of common electrodes through a plurality of inspection thin film transistors; and an inspection gate line connected to a gate electrode of each of the plurality of inspection thin film transistors.

16 Claims, 9 Drawing Sheets

DISPLAY DEVICE

CROSS-REFERENCE TO RELATED APPLICATION

This application claims priority from Japanese application JP 2019-014400, filed Jan. 30, 2019. This Japanese application is incorporated herein by reference.

BACKGROUND

1. Technical Field

The present disclosure relates to a display device.

2. Description of the Related Art

Conventionally, various display devices with a touch panel have been proposed. Recently, what is called an in-cell type display device with a touch detection function in which a function of the touch panel is incorporated in the display panel is proposed in order to achieve making the whole display device thin. For example, the display device like this is disclosed in U. S. Patent Application Publication No. 2016/0188063. U. S. Patent Application Publication No. 2016/0188063 discloses what is called a self-capacitance type touch detection that detects a capacitance generated between a common electrode and a finger when the finger approaches the display panel.

SUMMARY

However, a configuration for detecting an electric connection failure between a plurality of common electrodes used to detect a touch position has not been implemented in the display device having the in-cell type touch detection function and the self-capacitance type touch detection function as disclosed in U.S. Patent Application Publication No. 2016/0188063.

The present disclosure has been made in view of these problems, and an object of the present disclosure is to implement a configuration for detecting the electric connection failure between the plurality of common electrodes used to detect the touch position in the display device having the in-cell type and the self-capacitance type touch detection function.

Solution to Problem

To solve the above problem, a display device comprising: a plurality of source lines extending in a first direction; a plurality of gate lines extending in a second direction intersecting the first direction; a plurality of pixel electrodes arrayed in the first direction and the second direction; a plurality of common electrodes disposed corresponding to a plurality of touch regions arrayed in the first direction and the second direction, the plurality of common electrodes being disposed while opposed to the plurality of pixel electrodes; a plurality of sensor electrode lines electrically connected to the plurality of common electrodes; a plurality of inspection signal lines electrically connected to the plurality of common electrodes through a plurality of inspection thin film transistors; and an inspection gate line connected to a gate electrode of each of the plurality of inspection thin film transistors.

The configuration according to the present disclosure can implement a configuration for detecting the electric connection failure between the plurality of common electrodes used to detect the touch position in the display device having the in-cell type and the self-capacitance type touch detection function.

DETAILED DESCRIPTION

Figure 1:
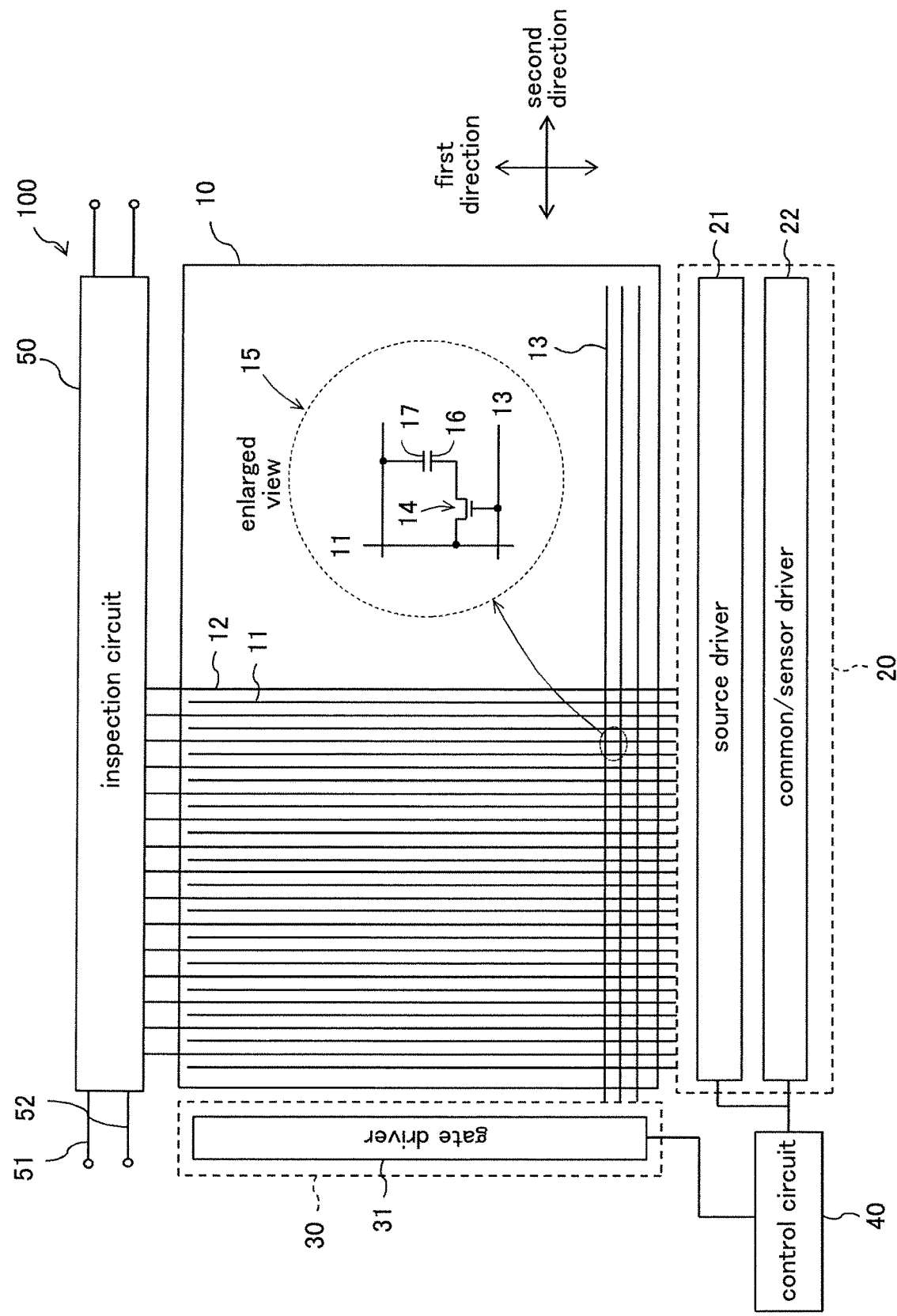
FIG. 1 is a schematic plan view illustrating a schematic configuration of display device according to the exemplary embodiment of the present disclosure.

Hereinafter, an exemplary embodiment of the present disclosure will be described with reference to the drawings. FIG. 1 is a schematic plan view illustrating a schematic configuration of display device 100 according to the exemplary embodiment of the present disclosure. Display device 100 includes display panel 10, first drive circuit 20, second drive circuit 30, control circuit 40, inspection circuit 50, a power supply unit (not illustrated), and a backlight device (not illustrated). First drive circuit 20 and second drive circuit 30 may be included in display panel 10.

A plurality of source lines 11 extending in a first direction, a plurality of sensor electrode lines 12 extending in the first direction, and a plurality of gate lines 13 extending in a second direction intersecting with the first direction are provided in display panel 10. The plurality of source lines 11 are arranged at substantially equal intervals in the second direction, the plurality of sensor electrode lines 12 are arranged at substantially equal intervals in the second direction, and the plurality of gate lines 13 are arranged at substantially equal intervals in the first direction. Thin film transistor 14 is provided at each intersection of each source line 11 and each gate line 13.

First drive circuit 20 includes source driver 21 that outputs a data signal (display voltage) to each source line 11 and common sensor driver 22 that outputs a common voltage and a sensor voltage to each sensor electrode line 12. Source driver 21 and common sensor driver 22 may be constructed with one IC (Integrated Circuit) or constructed with two independent ICs. Second drive circuit 30 includes gate driver 31 that outputs a gate signal (scan signal) to each gate line 13.

In display panel 10, a plurality of pixels 15 are arranged in the first direction and the second direction while corresponding to the intersections of source lines 11 and gate lines 13. Although details will be described later, display panel 10 includes a thin film transistor substrate, a color filter substrate, and a liquid crystal layer sandwiched between the two substrates. In the thin film transistor substrate, pixel electrode 16 is provided according to each pixel 15. That is, pixel electrodes 16 are arrayed in the first direction and the second direction. In the thin film transistor substrate, common electrodes 17 are disposed at a ratio of one per the plurality of pixels 15 so as to be opposed to the plurality of pixel electrodes 16. Each common electrode 17 has a function as an electrode used for displaying the image and a function as an electrode (sensor electrode) used for detecting a touch position. That is, display panel 10 has an image display function and a touch detection function. Common electrode 17 is disposed corresponding to each of the plurality of touch regions arrayed in the first direction and the second direction.

Figure 2:
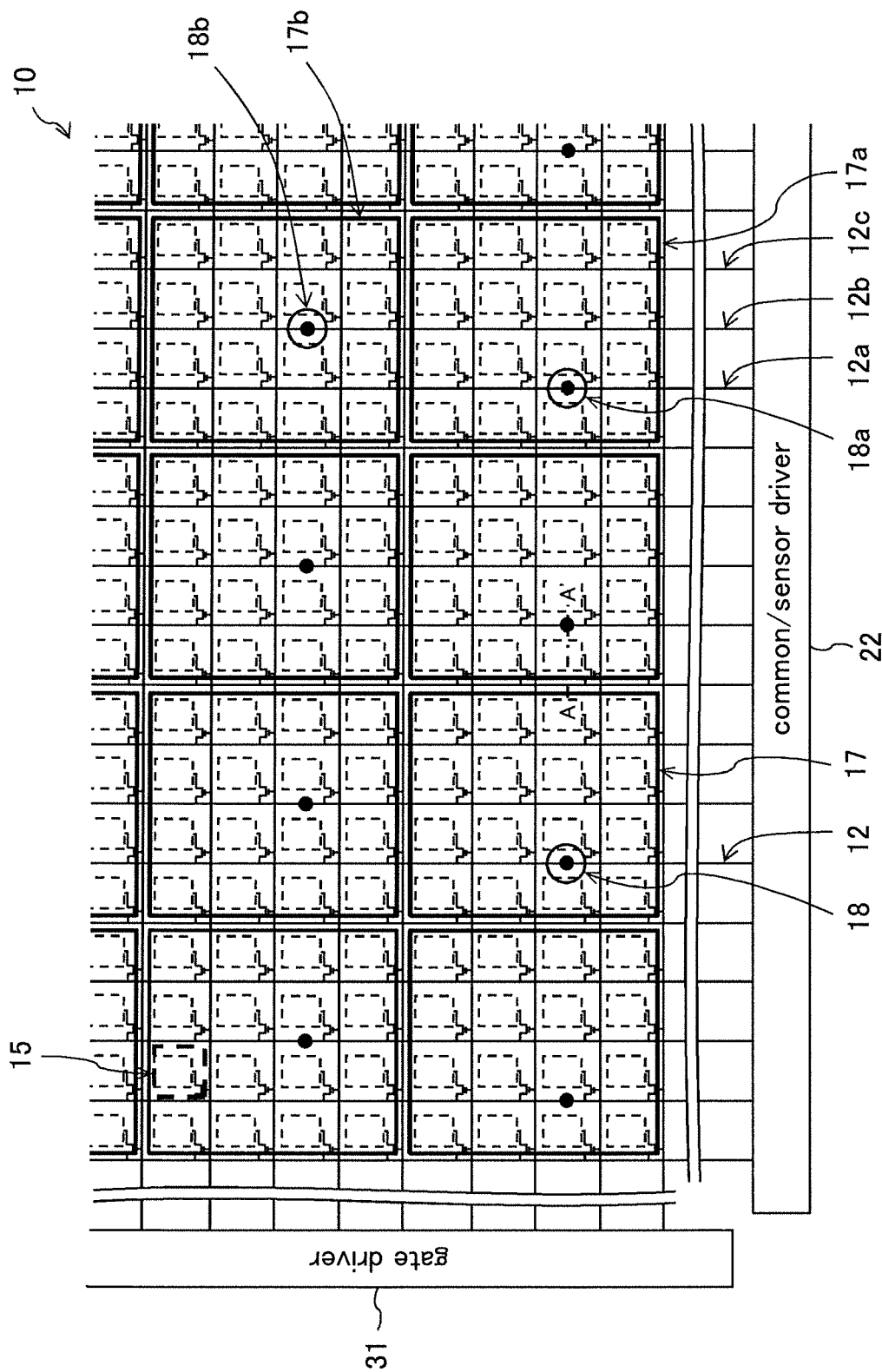
FIG. 2 is a schematic plan view illustrating a configuration example of display panel according to the exemplary embodiment of the present disclosure.

FIG. 2 is a schematic plan view illustrating a configuration example of display panel 10 of the exemplary embodiment. In FIG. 2, source line 11 and source driver 21 are omitted for convenience. In the example of FIG. 2, the plurality of common electrodes 17 are provided at a rate of one per every group of 16 pixels 15 including four pixels 15 in the first direction and four pixels 15 in the second direction. Actually, for example, common electrodes 17 may be provided at a ratio of one per every several hundred pixels 15. However, for convenience, common electrodes 17 are provided at a rate of one per every group of 16 pixels 15 in FIG. 2. The plurality of common electrodes 17 have substantially the same shape, and are regularly arrayed. In planar view, each common electrode 17 overlaps a plurality of sensor electrode lines 12, and is electrically connected to one of the plurality of sensor electrode lines 12 through through-hole 18. In the configuration of FIG. 2, common electrode 17*a* overlaps three sensor electrode lines 12*a*, 12*b*, 12*c*, and is electrically connected to one of sensor electrode lines 12*a* through through-hole 18*a*. Common electrode 17*b* overlaps three sensor electrode lines 12*a*, 12*b*, 12*c*, and is electrically connected to one of sensor electrode lines 12*b* through through-hole 18*b*.

Figure 3:
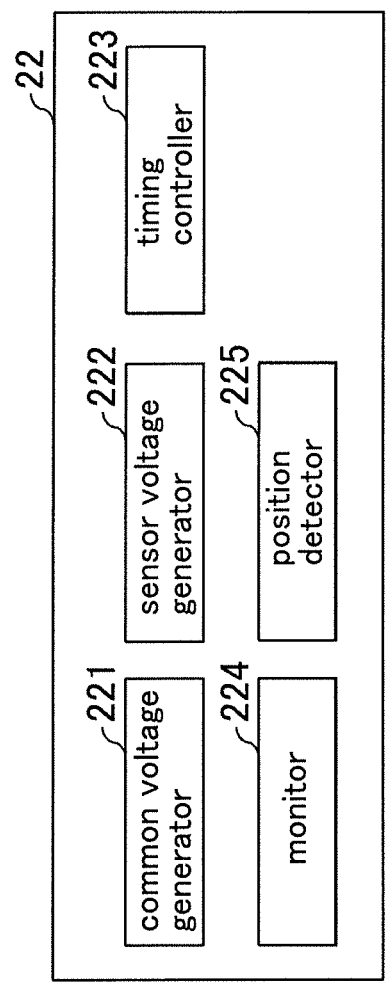
FIG. 3 is a block diagram illustrating a configuration example of common sensor driver according to the exemplary embodiment of the present disclosure.

FIG. 3 is a block diagram illustrating a configuration example of common sensor driver 22 of the exemplary embodiment. Common sensor driver 22 includes common voltage generator 221, sensor voltage generator 222, timing controller 223, monitor 224, and position detector 225. The configuration of common sensor driver 22 is not limited to the exemplary embodiment, but a known configuration can be adopted.

Common voltage generator 221 generates a common voltage (reference voltage) for image display. Common sensor driver 22 supplies the generated common voltage to common electrode 17 through sensor electrode line 12 during a writing period in which the data signal (display voltage) is supplied to pixel electrode 16. Sensor voltage generator 222 generates a sensor voltage detecting the touch position. Common sensor driver 22 supplies the generated sensor voltage to common electrode 17 through sensor electrode line 12 in a non-writing period after the writing period. Timing controller 223 controls timing at which common sensor driver 22 outputs the common voltage and the sensor voltage based on a timing signal (horizontal synchronizing signal and vertical synchronizing signal) received from control circuit 40. Monitor 224 monitors (measures) current (charge) when the sensor voltage is supplied to common electrode 17. Position detector 225 detects a coordinate of the touch position based on a measurement result of monitor 224. In FIG. 3, position detector 225 is provided inside common sensor driver 22, but may be provided inside control circuit 40.

An example of a touch position detection method will be described below. Display device 100 detects the touch position by a self-capacitance method of a capacitive system. Specifically, when a finger approaches a surface of display panel 10, capacitance is generated between common electrode (sensor electrode) 17 and the finger. When the capacitance is generated, parasitic capacitance in common electrode 17 increases, and the current (charge) increases when the sensor voltage is supplied to common electrode 17. Common sensor driver 22 detects the position, that is, the coordinate of contact with display panel 10 based on a fluctuation amount of the current (charge). A known method can be adopted to a self-capacitance type touch position detection method. The detection of the touch position may be performed in a non-display period.

An example of a sectional structure of display panel 10 will be described below with reference to FIG. 4. Various sectional structures can be applied to display panel 10. In the exemplary embodiment, a structure in which common electrode (sensor electrode) 17 is disposed in a layer below pixel electrode 16 (on back surface side) will be described by way of example. Alternatively, common electrode (sensor electrode) 17 may be disposed in a layer above pixel electrode 16 (on display surface side).

Figure 4:
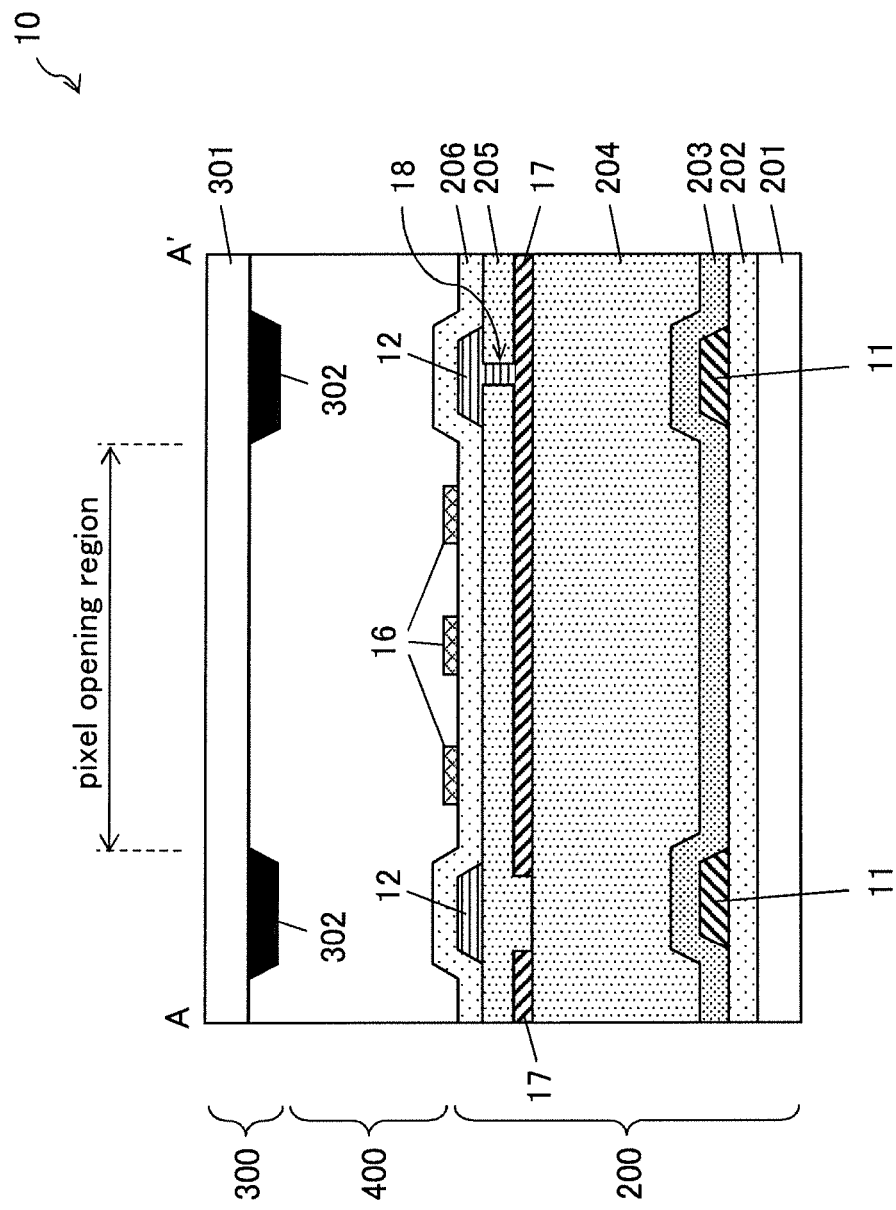
FIG. 4 is a schematic diagram illustrating section A-A' in FIG. 2 in display panel according to the exemplary embodiment of the present disclosure.

FIG. 4 is a schematic diagram illustrating section A-A' in FIG. 2 in display panel 10 of the exemplary embodiment. Display panel 10 includes thin film transistor substrate 200, color filter substrate 300, and liquid crystal layer 400 sandwiched between the two substrates.

In thin film transistor substrate 200, a plurality of gate lines 13 (not illustrated) are formed on glass substrate 201, first insulating film 202 is formed so as to cover the plurality of gate lines 13, a plurality of source lines 11 are formed on first insulating film 202, second insulating film 203 is formed so as to cover the plurality of source lines 11, and third insulating film 204 is formed on second insulating film 203. For example, third insulating film 204 is made of a photosensitive organic material mainly containing acryl. A plurality of common electrodes 17 are formed on third insulating film 204, fourth insulating film 205 is formed so as to cover the plurality of common electrodes 17, and through-hole 18 is made in a part of fourth insulating film 205. Adjacent common electrodes 17 are not electrically connected to each other because fourth insulating film 205 is disposed between the adjacent common electrodes 17. A plurality of sensor electrode lines 12 are formed on fourth insulating film 205 and in through-hole 18, and fifth insulating film 206 is formed so as to cover the plurality of sensor electrode lines 12, and a plurality of pixel electrodes 16 are formed on fifth insulating film 206. Sensor electrode line 12 is formed at a position overlapping source line 11 in planar view. Sensor electrode line 12 may be formed at a position that does not overlap source line 11 in planar view. For example, in planar view, sensor electrode line 12 may be disposed side by side with source line 11, or disposed so as to partially overlap source line 11. In planar view, thin film transistor substrate 200 may include a combination of sensor electrode lines 11 that overlap source lines 12 and sensor electrode lines 12 that do not overlap source lines 11. Sensor electrode line 12 is electrically connected to common electrode 17 through through-hole 18. Because fourth insulating film 205 is disposed between sensor electrode line 12 and common electrode 17, sensor electrode line 12 is not electrically connected to common electrodes 17 except for common electrode 17 electrically connected to sensor electrode line 12 through through-hole 18. A slit is formed in pixel electrode 16. Although not illustrated, an alignment film is formed on pixel electrode 16, and a polarizing plate is formed outside glass substrate 201. A liquid crystal capacitance is formed between pixel electrode 16 and common electrode 17.

In color filter substrate 300, black matrix 302 is formed on glass substrate 301. Although not illustrated, a color filter is formed on glass substrate 301, an overcoat film is formed so as to cover the color filter, and the alignment film is formed on the overcoat film. The polarizing plate is formed outside color filter substrate 300.

In display device 100, an electric field generated between pixel electrode 16 and common electrode 17 is applied to liquid crystal layer 400 to drive the liquid crystal, whereby an amount of light passing through liquid crystal layer 400 is adjusted to display the image.

As described above with reference to FIG. 1, display device 100 of the present disclosure includes inspection circuit 50, and can detect an electric connection failure between the plurality of common electrodes 17 used for the touch detection using inspection circuit 50.

Figure 5:
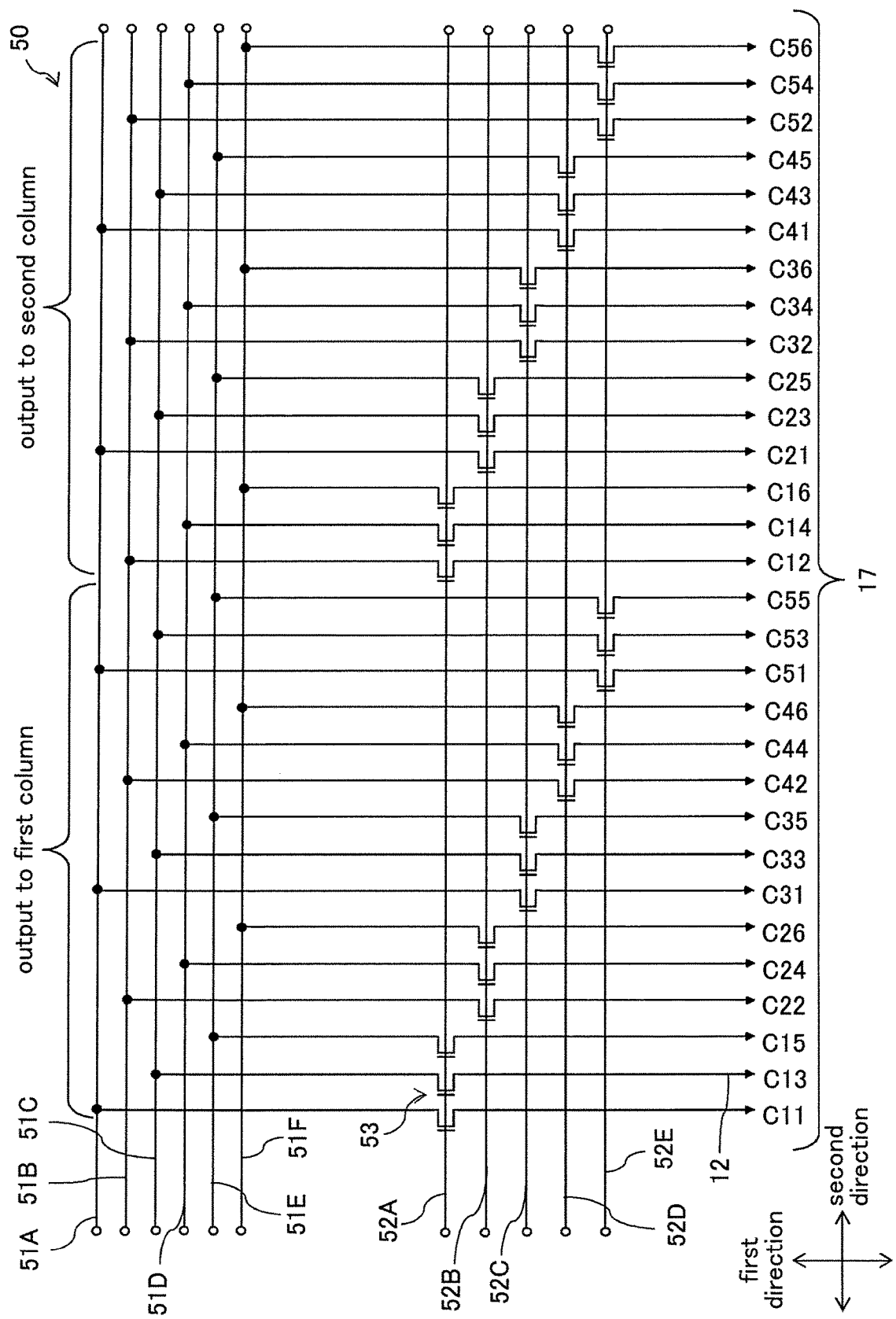
FIG. 5 is a schematic plan view illustrating a configuration example of inspection circuit according to the exemplary embodiment of the present disclosure.
Figure 6:
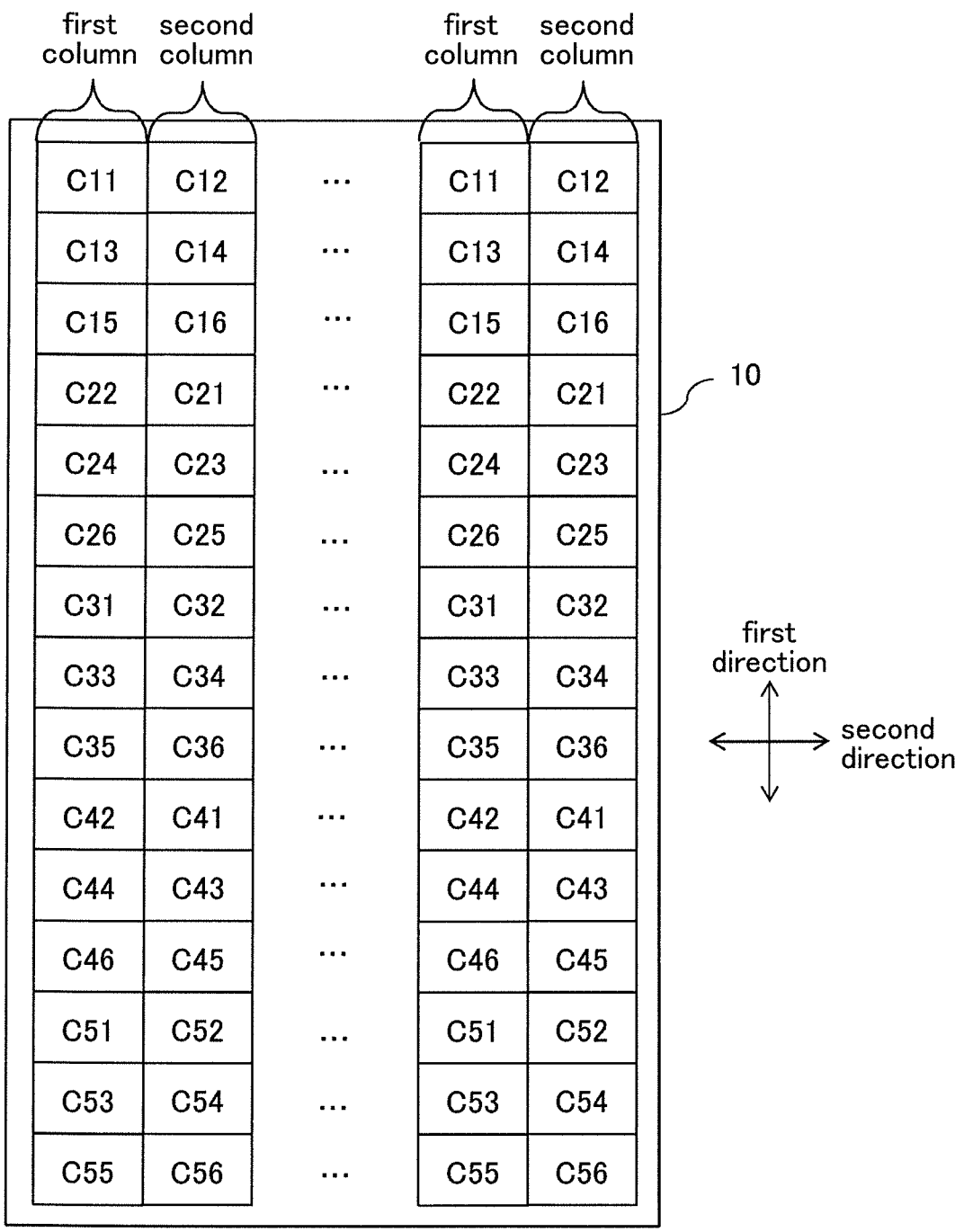
FIG. 6 is a schematic plan view illustrating an arrangement example of common electrode connected to inspection circuit according to the exemplary embodiment of the present disclosure.

FIG. 5 is a schematic plan view illustrating a configuration example of inspection circuit 50 of the exemplary embodiment of the present disclosure. FIG. 6 is a schematic plan view illustrating an arrangement example of common electrode 17 (common electrode C11 to common electrode C56) connected to inspection circuit 50 of the exemplary embodiment.

As illustrated in FIG. 5, inspection circuit 50 includes a plurality of inspection signal lines 51 (inspection signal line 51A to inspection signal line 51F), a plurality of inspection gate lines 52 (inspection gate line 52A to inspection gate line 52E), and a plurality of inspection thin film transistors 53. The plurality of inspection signal lines 51 are electrically connected to the plurality of common electrodes 17 (common electrode C11 to common electrode C56) through the plurality of inspection thin film transistors 53 and the plurality of sensor electrode lines 12 extending in the first direction. Numbers of common electrodes 17 (common electrode C11 to common electrode C56) in FIG. 5 has a correspondence relation numbers of common electrode 17 (common electrode C11 to common electrode C56) in FIG. 6. The plurality of inspection gate lines 52 are connected to gate electrodes of the plurality of inspection thin film transistors 53, and control on-off of inspection thin film transistor 53. In the exemplary embodiment, each inspection gate line 52 is connected to the gate electrodes of six inspection thin film transistors 53. Although the plurality of inspection signal lines 51 may be connected to the plurality of common electrodes 17 through wirings different from the plurality of sensor electrode lines 12, desirably the plurality of inspection signal lines 51 are connected to the plurality of common electrodes 17 through the plurality of sensor electrode lines 12 to be able to decrease the number of wirings extending in display panel 10. The electric connection failure due to disconnection of the plurality of sensor electrode lines 12 can be detected by connecting the plurality of inspection signal lines 51 to the plurality of common electrodes 17 through the plurality of sensor electrode lines 12.

Numeral x in each common electrode Cxy means which inspection gate line 52 is connected to common electrode Cxy. Numeral x of 1 means that common electrode Cxy is connected to inspection gate line 52A. Numeral x of 2 means that common electrode Cxy is connected to inspection gate line 52B. Numeral x of 3 means that common electrode Cxy is connected to inspection gate line 52C. Numeral x of 4 means that common electrode Cxy is connected to inspection gate line 52D. Numeral x of 5 means that common electrode Cxy is connected to inspection gate line 52E.

Number y in each common electrode Cxy means which inspection signal line 51 is connected to common electrode Cxy. For example, numeral y of 1 means that common electrode Cxy is connected to inspection signal line 51A. Numeral y of 2 means that common electrode Cxy is connected to inspection signal line 51B. Numeral y of 3 means that common electrode Cxy is connected to inspection signal line 51C. Numeral y of 4 means that common electrode Cxy is connected to inspection signal line 51D. Numeral y of 5 means that common electrode Cxy is connected to inspection signal line 51E. Numeral y of 6 means that common electrode Cxy is connected to inspection signal line 51F.

As illustrated in FIG. 6, the plurality of common electrodes 17 include the plurality of common electrodes 17 arrayed in the first direction. In the example of FIG. 6, the plurality of common electrodes 17 (common electrode C11 to common electrode C55) are arrayed in the first direction as a first column, and the plurality of common electrodes 17 (common electrode C12 to common electrode C56) are arrayed in the first direction as a second column. In the example of FIG. 6, the first column and the second column are repeatedly arranged in the second direction in display panel 10.

As illustrated in FIG. 6, the plurality of common electrodes 17 include the plurality of common electrodes 17 arrayed in the second direction. In the example of FIG. 6, for example, two common electrodes 17 (common electrode C11 and common electrode C12) are arrayed in the second direction so as to be repeatedly arranged.

As illustrated in FIG. 5, the plurality of inspection thin film transistors 53 are connected to the plurality of common electrodes 17 through the plurality of sensor electrode lines 12 extending in the first direction. First to fifteenth sensor electrode lines 12 from the left in FIG. 5 are connected to the plurality of common electrodes 17 (common electrode C11 to common electrode C55) in the first column in FIG. 6, and sixteenth to thirtieth sensor electrode lines 12 from the left in FIG. 5 are connected to the plurality of common electrodes 17 (common electrode C12 to common electrode C56) in the second column in FIG. 6. First to fifteenth sensor electrode lines 12 from the left in FIG. 5 extend in the first direction so as to overlap the plurality of common electrodes 17 (common electrode C11 to common electrode C55) in the first column in FIG. 6 in planar view. For example, first sensor electrode line 12 from the left in FIG. 5 is connected to common electrode C11 in FIG. 6, and fifteenth sensor electrode line 12 from the left in FIG. 5 is connected to common electrode C55 in FIG. 6. Similarly, sixteenth to thirtieth sensor electrode lines 12 from the left in FIG. 5 extend in the first direction so as to overlap the plurality of common electrodes 17 (common electrode C12 to common electrode C56) in the second column in FIG. 6 in planar view. For example, the sixteenth sensor electrode line 12 from the left in FIG. 5 is connected to common electrode C12 in FIG. 6, and thirtieth sensor electrode line 12 from the left in FIG. 5 is connected to common electrode C56 in FIG. 6.

As illustrated in FIG. 5, the plurality of common electrodes 17 (for example, common electrode C11 to common electrode C55) arrayed in the first direction are connected to different inspection thin film transistors 53. As illustrated in FIG. 5, the plurality of common electrodes 17 (for example, common electrode C11 and common electrode C12) adjacent to each other in the second direction are connected to different inspection thin film transistors 53.

Two common electrodes 17 (for example, common electrode C11 and common electrode C13) adjacent to each other in the first direction are connected to different inspection signal lines 51. For example, common electrode C11 and common electrode C13 in FIG. 6 are adjacent to each other in the first direction, and as illustrated in FIG. 5, common electrode C11 is connected to inspection signal line 51A while common electrode C13 is connected to inspection signal line 51C. This relationship is satisfied not only between common electrode C11 and common electrode C13, but also in all the plurality of common electrodes 17 (for example, common electrode C11 to common electrode C55) arrayed in the first direction.

Two common electrodes 17 (for example, common electrode C11 and common electrode C12) adjacent to each other in the second direction are connected to different inspection signal lines 51. For example, common electrode C11 and common electrode C12 in FIG. 6 are adjacent to each other in the second direction, and as illustrated in FIG. 5, common electrode C11 is connected to inspection signal line 51A while common electrode C12 is connected to inspection signal line 51B. This relationship is satisfied not only between common electrode C11 and common electrode C12 but also in all the plurality of common electrodes 17 arrayed in the second direction.

In the exemplary embodiment, the first common electrode (for example, common electrode C14) included in the plurality of common electrodes 17 is connected to inspection signal line 51 different from inspection signal lines 51 connected to the other common electrodes 17 disposed adjacent to a periphery of the first common electrode (for example, common electrode C14) among inspection signal lines 51. For example, when common electrode C14 is taken as the first common electrode, common electrode 17 disposed adjacent to the periphery of common electrode C14 includes a total of eight common electrodes (two common electrodes C11, one common electrode C12, two common electrodes C13, two common electrodes C15, and one common electrode C16). As illustrated in FIG. 5, common electrode C14 that is the first common electrode is connected to inspection signal line 51D through inspection thin film transistor 53. On the other hand, common electrode C11 is connected to inspection signal line 51A through inspection thin film transistor 53, and common electrode C12 is connected to inspection signal line 51B through inspection thin film transistor 53, common electrode C13 is connected to inspection signal line 51C through inspection thin film transistor 53, common electrode C15 is connected to inspection signal line 51E through inspection thin film transistor 53, and common electrode C16 is connected to inspection signal line 51F through inspection thin film transistor 53. That is, when common electrode C14 is taken as the first common electrode, common electrode 17 disposed adjacent to the periphery of common electrode C14 is connected to inspection signal lines 51 except for inspection signal line 51A to which common electrode C14 is connected through inspection thin film transistor 53.

In the exemplary embodiment, the signal having the same polarity is applied to inspection signal lines 51A, 51D, 51E. The signal having the same polarity is applied to inspection signal lines 51B, 51C, 51F, and the signal having an opposite polarity is applied to inspection signal lines 51A, 51D, 51E. As a specific example, when a +5-V signal is applied to inspection signal lines 51A, 51D, 51E, a −5-V signal is applied to inspection signal lines 51B, 51C, 51F.

Then, the signals having the different polarities are applied to two common electrodes 17 (for example, common electrode C11 and common electrode C13) adjacent to each other in the first direction through the plurality of inspection signal lines 51. For example, common electrode C11 is connected to inspection signal line 51A through inspection thin film transistor 53. As illustrated in FIG. 6, common electrode C13 adjacent to common electrode C11 in the first direction is connected to inspection signal line 51C through inspection thin film transistor 53. As described above, because the signals having opposite polarities are applied to inspection signal line 51A and inspection signal line 51C, the signals having the opposite polarities are applied to common electrode C11 and common electrode C13 adjacent to each other in the first direction.

Then, the signals having the different polarities are applied to two common electrodes 17 (for example, common electrode C11 and common electrode C12) adjacent to each other in the second direction through the plurality of inspection signal lines 51. For example, common electrode C11 is connected to inspection signal line 51A through inspection thin film transistor 53. As illustrated in FIG. 6, common electrode C12 adjacent to common electrode C11 in the second direction is connected to inspection signal line 51B through inspection thin film transistor 53. As described above, because the signals having the opposite polarities are applied to inspection signal line 51A and inspection signal line 51B, the signals having the opposite polarities are applied to common electrode C11 and common electrode C12 adjacent to each other in the second direction.

In the exemplary embodiment, the combination of inspection gate line 52 and inspection signal line 51 connected to first common electrode 17 included in the plurality of common electrodes 17 (for example, common electrode C11 to common electrode C55) arrayed in the first direction is different from the combination of inspection gate line 52 and inspection signal line 51 connected to another common electrodes 17 included in the plurality of common electrodes 17 arrayed in the first direction. For example, common electrode C11 is connected to inspection gate line 52A and inspection signal line 51A, but common electrode 17 connected to both inspection gate line 52A and inspection signal line 51A does not exist in other common electrodes 17 included in the first column in FIG. 6. As described above, numeral x in each common electrode Cxy means which inspection gate line 52 is connected to common electrode Cxy, and the numeral y in each common electrode Cxy means which inspection signal line 51 is connected to common electrode Cxy. Thus, in the first column of FIG. 6, the same numerals x and y do not exist in each common electrode Cxy.

With this configuration, the electric connection failure can accurately be detected between the plurality of common electrodes 17 arrayed in the first direction. For example, when at least two combinations of inspection gate lines 52 and inspection signal lines 51 to be connected exist in the plurality of common electrodes 17 included in the first column, the same inspection signal is input to at least two common electrodes 17 at the same timing. On the other hand, in the configuration of the exemplary embodiment, the same inspection signal is not input to the plurality of common electrodes 17 arrayed in the first direction at the same timing. As a result, the electric connection failure can accurately be detected between the plurality of common electrodes 17 in the first direction.

In the exemplary embodiment, the combination of inspection gate line 52 and inspection signal line 51 connected to one (for example, common electrode C11) of two common electrodes 17 (for example, common electrode C11 and common electrode C12) adjacent to each other in the second direction is different from the combination of inspection gate line 52 and inspection signal line 51 connected to the other (for example, common electrode C12) of two common electrodes 17 (for example, common electrode C11 and common electrode C12) adjacent to each other in the second direction. That is, in FIG. 6, two common electrodes Cxy adjacent to each other in the second direction are different from each other in at least one of numerals x and y in each common electrode Cxy.

In display device 100 including inspection circuit 50, a method for detecting the electric connection failure between the plurality of common electrodes 17 used for the touch detection will be described below.

As a first step, a transistor control signal turning on inspection thin film transistor 53 is input to inspection gate line 52A in FIG. 5. Consequently, inspection thin film transistor 53 connected so as to be interposed between inspection gate line 52A and common electrodes C11, C12, C13, C14, C15, C16 is turned on.

Subsequently, as a second step, the inspection signal is input to each inspection signal line 51. As described above, in the exemplary embodiment, the signal having the same polarity is applied to inspection signal lines 51A, 51D, 51E. The signal having the same polarity is applied to inspection signal lines 51B, 51C, 51F, and the signal having an opposite polarity is applied to inspection signal lines 51A, 51D, 51E. For this reason, when the +5-V signal is applied to inspection signal lines 51A, 51D, 51E, the −5-V signal is applied to inspection signal lines 51B, 51C, 51F.

In the second step, potentials at the plurality of pixel electrodes 16 disposed so as to be opposed to common electrode 17 are set to 0 V, for example. Thus, with the input of the inspection signal, a potential difference is generated between each common electrode 17 and pixel electrode 16, and the liquid crystal is driven in the touch region defined by each common electrode 17, whereby the amount of light passing through liquid crystal layer 400 is changed to display the image. The electric connection failure can be detected between the plurality of common electrodes 17 by inspecting this image display state.

For example, when a short circuit is generated between common electrode C11 and common electrode C13 due to existence of dust between various wires (for example, sensor electrode line 12) and common electrode 17, because the signal applied to common electrode C11 and the signal applied to common electrode C13 have the opposite polarities, the opposite polarities cancel each other, and the potentials at common electrode C11 and common electrode C13 become 0 V. For this reason, the potential difference is not generated between common electrode C11 and the plurality of pixel electrodes 16 and between common electrode C13 and the plurality of pixel electrodes 16, and the liquid crystal is not driven. The amount of light passing through liquid crystal layer 400 is not changed, and the desired image is not displayed. In this way, the electric connection failure can be detected between the plurality of common electrodes 17.

Subsequently, as a third step, the transistor control signal turning off inspection thin film transistor 53 is input to inspection gate line 52A. Consequently, inspection thin film transistor 53 connected so as to be interposed between inspection gate line 52A and common electrodes C11, C12, C13, C14, C15, C16 is turned off.

As a fourth step, the transistor control signal turning on inspection thin film transistor 53 is input to inspection gate line 52B. Consequently, inspection thin film transistor 53 connected so as to be interposed between inspection gate line 52B and common electrodes C21, C22, C23, C24, C25, C26 is turned on.

Subsequently, similarly to the second step, the inspection signal is input to each inspection signal line 51 as a fifth step. In the fifth step, the potentials at the plurality of pixel electrodes 16 disposed so as to be opposed to common electrode 17 are set to 0 V, for example. Thus, with the input of the inspection signal, a potential difference is generated between each common electrode 17 and pixel electrode 16, and the liquid crystal is driven in the touch region defined by each common electrode 17, whereby the amount of light passing through liquid crystal layer 400 is changed to display the image. The electric connection failure can be detected between the plurality of common electrodes 17 by inspecting this image display state.

For example, when a short circuit is generated between common electrode C22 and common electrode C21 due to existence of dust between various wires (for example, sensor electrode line 12) and common electrode 17, because the signal applied to common electrode C22 and the signal applied to common electrode C21 have the opposite polarities, the opposite polarities cancel each other, and the potentials of common electrode C22 and common electrode C21 become 0 V. For this reason, the potential difference is not generated between common electrode C22 and the plurality of pixel electrodes 16 and between common electrode C21 and the plurality of pixel electrodes 16, and the liquid crystal is not driven. The amount of light passing through liquid crystal layer 400 is not changed, and the desired image is not displayed. In this way, the electric connection failure can be detected between the plurality of common electrodes 17.

Subsequently, as a sixth step, the transistor control signal turning off inspection thin film transistor 53 is input to inspection gate line 52B. Consequently, inspection thin film transistor 53 connected so as to be interposed between inspection gate line 52B and common electrodes C21, C22, C23, C24, C25, C26 is turned off.

In this way, the electric connection failure can be detected between the plurality of common electrodes 17 in all the touch regions by repeating the step of inputting the transistor control signal turning on inspection thin film transistor 53 to inspection gate line 52, the step of inputting the inspection signal to inspection signal line 51, and the step of inputting the transistor control signal turning off inspection thin film transistor 53 to inspection gate line 52.

In repeating the above steps, desirably the polarity of the inspection signal input to inspection signal line 51 is opposite to the polarity of the previously-applied inspection signal. For example, in the second step, when the +5-V signal is applied to inspection signal lines 51A, 51D, 51E while the −5-V signal is applied to inspection signal lines 51B, 51C, 51F, desirably the −5-V signal is applied to inspection signal lines 51A, 51D, 51E while the +5-V signal is applied to inspection signal lines 51B, 51C, 51F in next inputting the inspection signal to inspection signal line 51. Degradation of liquid crystal molecules contained in liquid crystal layer 400 can be prevented by adopting the method.

In the exemplary embodiment, inspection circuit 50 includes the plurality of inspection gate lines 52, and the gate electrodes of the plurality of inspection thin film transistors 53 are connected to one of the plurality of inspection gate lines 52. Alternatively, as illustrated in FIG. 8, inspection circuit 50 may include only one inspection gate line 52.

However, all inspection signal lines 51 connected to the plurality of common electrodes 17 included in the first column vary in order to accurately detect the electric connection failure between the plurality of common electrodes 17 included in the first column. For this reason, when inspection circuit 50 includes only one inspection gate line 52, for example, when 15 common electrodes 17 are included in the first column, desirably 15 inspection signal lines 51 are provided as illustrated in FIG. 8.

Figure 8:
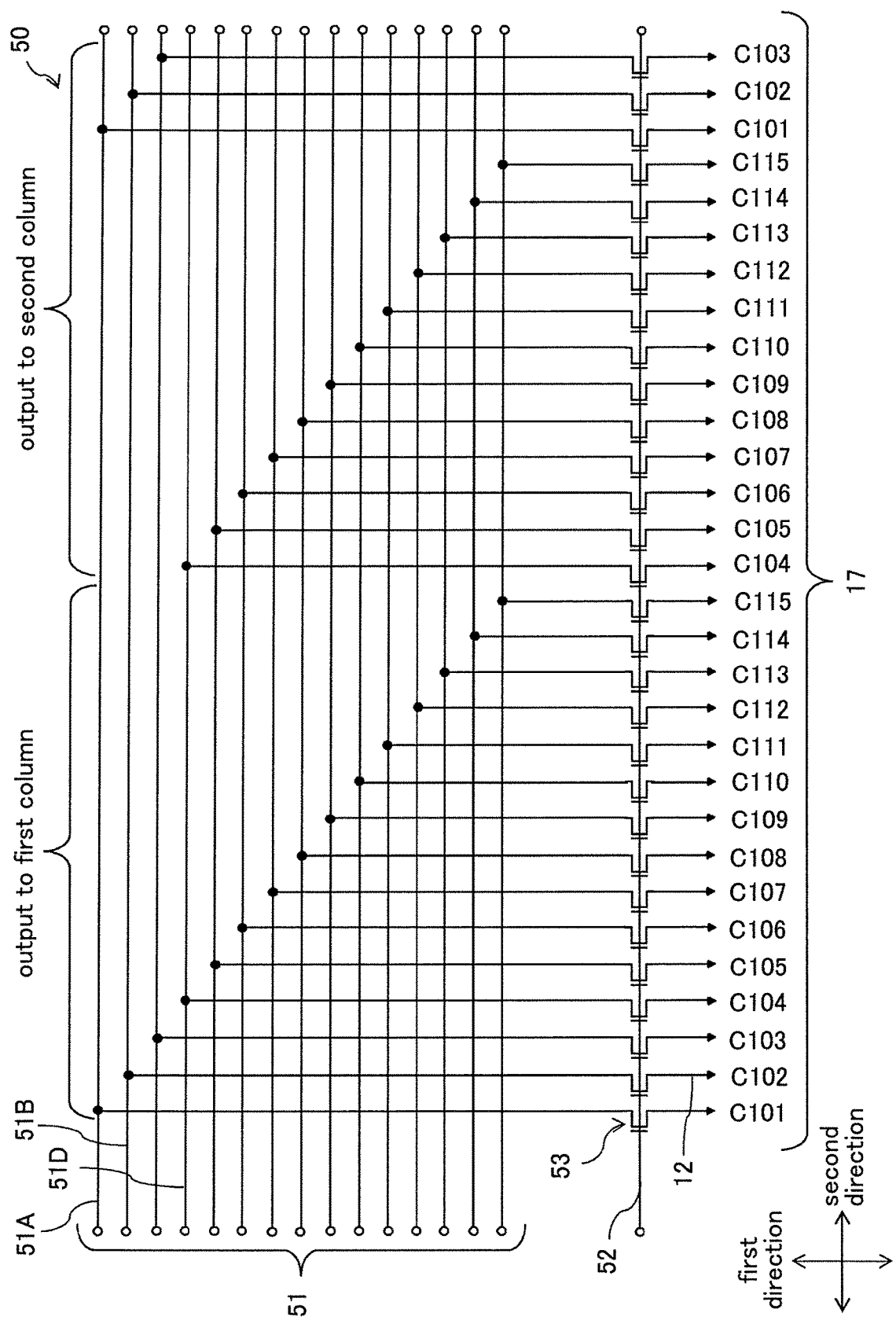
FIG. 8 is a schematic plan view illustrating a configuration another example of inspection circuit according to the exemplary embodiment of the present disclosure.

In the configuration of FIG. 8, for example, the +5-V inspection signal is applied to inspection signal lines 51 disposed in odd numbers from the top, and for example the −5-V inspection signal is applied to inspection signal lines 52 disposed in even numbers from the top.

Figure 9:
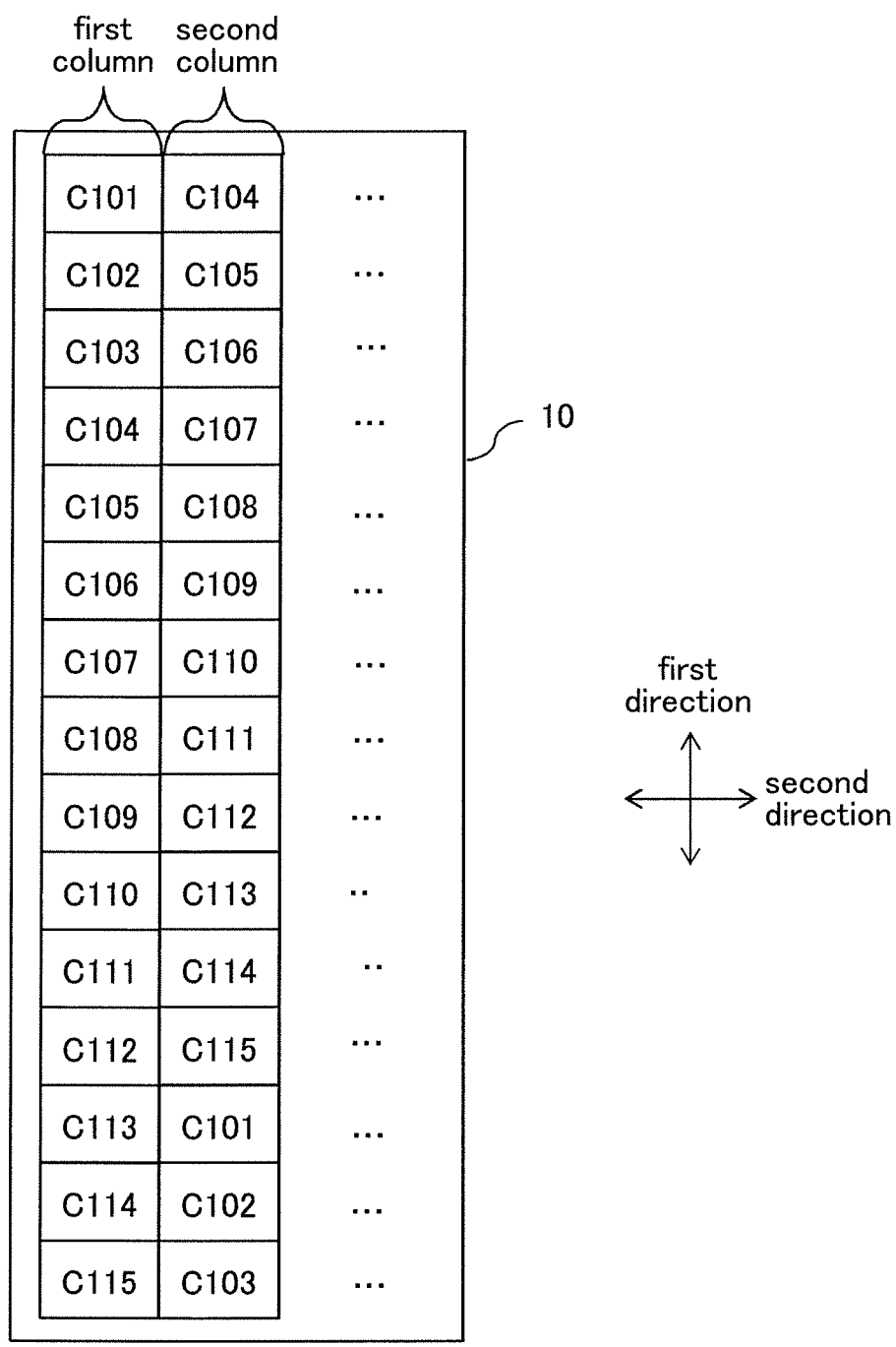
FIG. 9 is a schematic plan view illustrating another arrangement example of common electrode connected to inspection circuit according to the exemplary embodiment of the present disclosure.

As illustrated in FIG. 9, when common electrode 17 disposed in the first row of the first column is common electrode C101 connected to inspection signal line 51 (for example, inspection signal line 51A) disposed in the odd number (for example, the first) from the top, common electrode C102 adjacent to common electrode C101 in the first direction is connected to inspection signal line 51 (for example, inspection signal line 51B) disposed in the even number (for example, second) from the top. With this configuration, the polarities of the inspection signals applied to two common electrodes 17 (for example, common electrode C101 and common electrode C102) adjacent to each other in the first direction can be opposite to each other.

As illustrated in FIG. 9, when common electrode 17 disposed in the first column is common electrode C101 connected to inspection signal line 51 (for example, inspection signal line 51A) disposed in the odd number (for example, the first) from the top, common electrode C104 that is disposed in the second column and is adjacent to common electrode C101 in the second direction is connected to inspection signal line 51 (for example, inspection signal line 51D) disposed in the even number (for example, fourth) from the top. With this configuration, the polarities of the inspection signals applied to two common electrodes 17 (for example, common electrode C101 and common electrode C104) adjacent to each other in the second direction can be opposite to each other.

Even in the examples of FIGS. 8 and 9, the combination of inspection gate line 52 and inspection signal line 51 connected to the first common electrode (for example, common electrode C101) included in the plurality of common electrodes 17 (for example, common electrode C101 to common electrode C115) arrayed in the first direction can be different from the combination of inspection gate line 52 and inspection signal line 51 connected to another common electrodes 17 included in the plurality of common electrodes 17 (for example, common electrode C101 to common electrode C115) arrayed in the first direction. For example, common electrode C101 is connected to inspection signal line 51A disposed at the top in FIG. 8, but common electrode 17 connected to the inspection signal line 51A does not exist in another common electrode 17 included in the first column in FIG. 9. That is, in the configurations of FIGS. 8 and 9, all inspection signal lines 51 to be connected to the plurality of common electrodes 17 arrayed in the first direction vary because only one inspection gate line 52 exists.

Even in the example of FIGS. 8 and 9, the combination of inspection gate line 52 and inspection signal line 51 connected to one (for example, common electrode C101) of two common electrodes 17 (for example, common electrode C101 and common electrode C104) adjacent to each other in the second direction can be different from the combination of inspection gate line 52 and inspection signal line 51 connected to the other (for example, common electrode C104) of two common electrodes 17 (for example, common electrode C101 and common electrode C104) adjacent to each other in the second direction. That is, in the configurations of FIGS. 8 and 9, inspection signal lines 51 connected to two common electrodes 17 adjacent to each other in the second direction vary because only one inspection gate line 52 exists. That is, in FIG. 9, two common electrodes Cxy adjacent to each other in the second direction are different from each other in numeral y in each common electrode Cxy. In FIG. 9, x is displayed in 1 digit, and y is displayed in 2 digits.

However, as described above, in the configuration of FIG. 8, for example, when 15 common electrodes 17 are included in the first column, desirably 15 inspection signal lines 51 are provided as illustrated in FIG. 8. For this reason, the total number of inspection signal lines 51 and inspection gate lines 52 becomes 16, an area of inspection circuit 50 and an area of a frame region in the display panel are hardly reduced.

On the other hand, as illustrated in FIG. 5, inspection circuit 50 includes the plurality of inspection gate lines 52, and the gate electrodes of the plurality of inspection thin film transistors 53 are connected to one of the plurality of inspection gate lines 52, which allows the decrease of the total number of inspection signal lines 51 and inspection gate lines 52. That is, a product of inspection signal line 51 and inspection gate line 52 may be greater than or equal to the number of common electrodes 17 included in the first column in order that the combination of inspection signal line 51 and inspection gate line 52 connected to each common electrode 17 varies to detect the electric connection failure between the plurality of common electrodes 17 included in the first column. Thus, in the exemplary embodiment in which 15 common electrodes 17 are included in the first column, for example, when three inspection gate lines 52 and five inspection signal lines 51 exist, the product becomes 15, and the electric connection failure can be detected between the plurality of common electrodes 17 included in the first column. That is, when the total number of inspection signal lines 51 and inspection gate lines 52 becomes eight in the minimum configuration. When the number of common electrodes 17 included in the first column is N, the total number of inspection signal lines 51 and inspection gate lines 52 can be decreased by preparing an integral number of inspection signal lines 51 close to N (½) and an integral number of inspection gate lines 52 close to N (½), a product of the integral number of inspection signal lines 51 and the integral number of inspection gate lines 52 becoming N.

However, in the exemplary embodiment, in order that the number of inspection signal lines 51 to which the inspection signal having the same polarity as inspection signal line 51A is input is equal to the number of inspection signal lines 51 to which the inspection signal having the polarity opposite to inspection signal line 51A is input, six inspection signal lines 51 are provided to set the number of inspection signal lines 51 to the even number, and the inspection signal is input to two-column common electrodes 17. In this way, the number of inspection signal lines 51 to which the inspection signal having one of the polarities is input is equal to the number of inspection signal lines 51 to which the inspection signal of the other polarity is input. Consequently, even if the charge is generated by inputting the inspection signal to each inspection signal lines 51, the electric charges generated in display panel 10 can be canceled as a whole, and display unevenness can be prevented.

In the configuration of FIG. 6, the plurality of common electrodes 17 (common electrode C11 to common electrode C55) are arrayed in the first direction as the first column, the plurality of common electrodes 17 (common electrode C12 to common electrode C56) are arrayed in the first direction as the second column, and the first column and the second column are repeatedly disposed in the second direction in display panel 10. However, the present disclosure is not limited to the configuration in FIG. 6.

Figure 7:
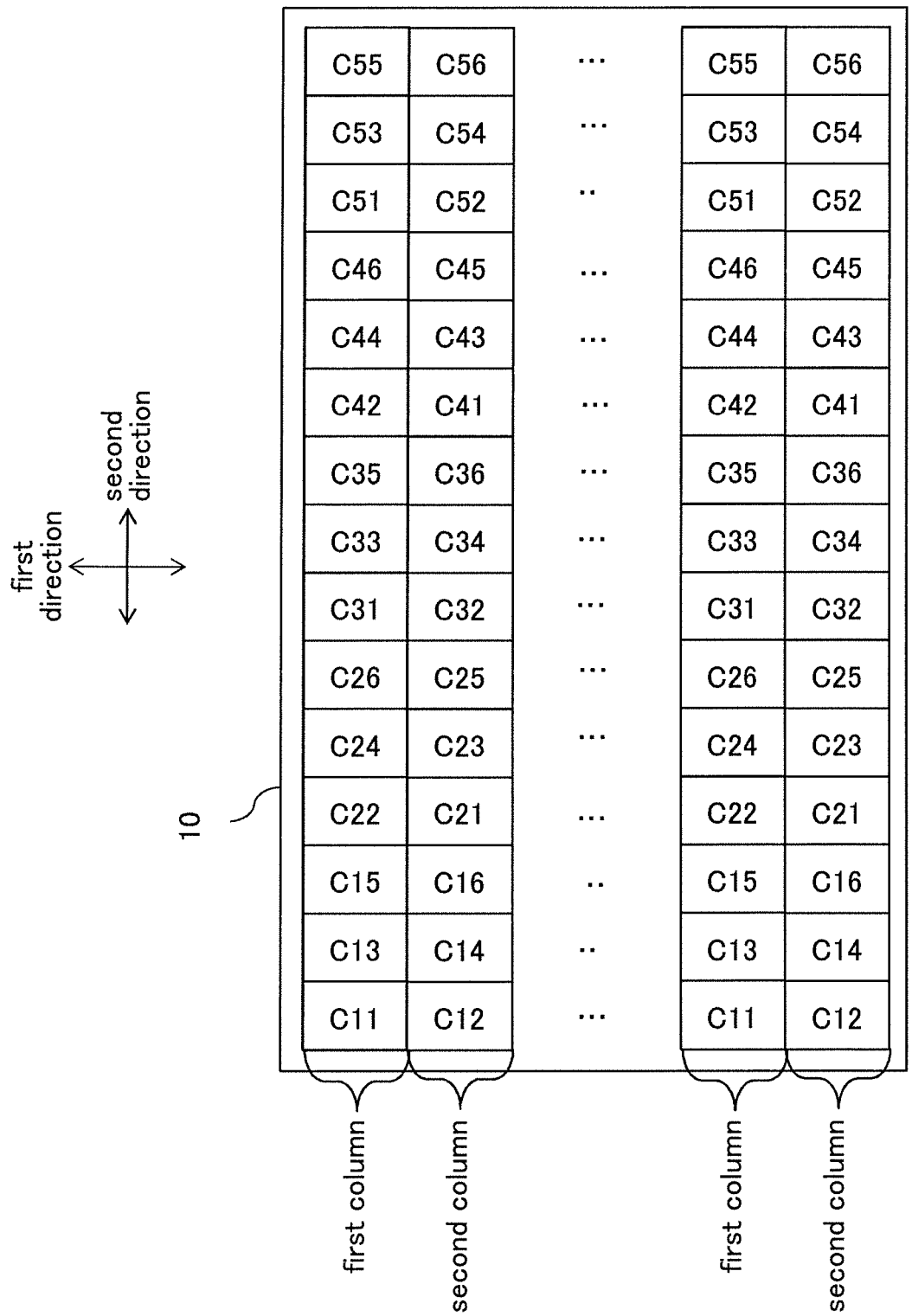
FIG. 7 is a schematic plan view illustrating another arrangement example of common electrode connected to inspection circuit according to the exemplary embodiment of the present disclosure.

For example, in the configuration of FIG. 7, the plurality of common electrodes 17 (common electrode C11 to common electrode C55) are arrayed in the second direction as the first column, and the plurality of common electrodes 17 (common electrode C12 to common electrode C56) are arrayed in the second direction as the second column. The first column and the second column are repeatedly disposed in the first direction in display panel 10.

In the configuration of FIG. 7, the combination of inspection gate line 52 and inspection signal line 51 connected to the first common electrode included in the plurality of common electrodes 17 (for example, common electrode C11 to common electrode C55) arrayed in the second direction may be different from the combination of inspection gate line 52 and inspection signal line 51 connected to another common electrode 17 included in the plurality of common electrodes 17 arrayed in the second direction. For example, common electrode C11 is connected to inspection gate line 52A and inspection signal line 51A, but common electrode 17 connected to both inspection gate line 52A and inspection signal line 51A does not exist in another common electrode 17 included in the first column arrayed in the second direction in FIG. 7. As described above, numeral x in each common electrode Cxy means which inspection gate line 52 is connected to common electrode Cxy, and the numeral y in each common electrode Cxy means which inspection signal line 51 is connected to common electrode Cxy. Thus, common electrode Cxy in which both the number x and the number y are the same may not exist in the first column in FIG. 7.

In the above, the specific embodiments of the present application have been described, but the present application is not limited to the above-mentioned embodiments, and various modifications may be made as appropriate without departing from the spirit of the present application.

What is claimed is:

1. A display device comprising:
    a plurality of source lines extending in a first direction;
    a plurality of gate lines extending in a second direction intersecting the first direction;
    a plurality of pixel electrodes arrayed in the first direction and the second direction;
    a plurality of common electrodes disposed corresponding to a plurality of touch regions arrayed in the first direction and the second direction, the plurality of common electrodes being disposed while opposed to the plurality of pixel electrodes;
    a plurality of sensor electrode lines electrically connected to the plurality of common electrodes;
    a plurality of inspection signal lines electrically connected to the plurality of common electrodes through a plurality of inspection thin film transistors; and
    an inspection gate line connected to a gate electrode of each of the plurality of inspection thin film transistors.

2. The display device according to claim 1, wherein the plurality of common electrodes arrayed in the first direction are connected to different inspection thin film transistors.

3. The display device according to claim 2, wherein two common electrodes adjacent to each other in the second direction are connected to different inspection thin film transistors.

4. The display device according to claim 1, wherein two common electrodes adjacent to each other in the first direction are connected to different inspection signal lines.

5. The display device according to claim 4, wherein two common electrodes adjacent to each other in the second direction are connected to different inspection signal lines.

6. The display device according to claim 1, wherein two common electrodes adjacent to each other in the second direction are connected to different inspection signal lines.

7. The display device according to claim 1, wherein a first common electrode included in the plurality of common electrodes is connected to an inspection signal line different from the inspection signal line connected to the common electrode disposed adjacent to a periphery of the first common electrode among the inspection signal lines.

8. The display device according to claim 1, wherein two common electrodes adjacent to each other in the first direction are different from each other in a polarity of a signal applied through the plurality of inspection signal lines.

9. The display device according to claim 8, wherein two common electrodes adjacent to each other in the second direction are different from each other in the polarity of the signal applied through the plurality of inspection signal lines.

10. The display device according to claim 1, wherein two common electrodes adjacent to each other in the second direction are different from each other in a polarity of a signal applied through the plurality of inspection signal lines.

11. The display device according to claim 1, wherein
    the inspection gate line is a plurality of inspection gate lines, and
    the gate electrodes of the plurality of inspection thin film transistors are connected to one of the plurality of inspection gate lines.

12. The display device according to claim 11, wherein one inspection gate line included in the plurality of inspection gate lines is connected to the gate electrodes of at least two inspection thin film transistors included in the plurality of inspection thin film transistors.

13. The display device according to claim 11, wherein a combination of the inspection gate line and the inspection signal line connected to a first common electrode included in the plurality of common electrodes arrayed in the first direction is different from a combination of the inspection gate line and the inspection signal line connected to another common electrodes included in the plurality of common electrodes arrayed in the first direction.

14. The display device according to claim 11, wherein a combination of the inspection gate line and the inspection signal line connected to one of the two common electrodes adjacent to each other in the second direction is different from a combination of the inspection gate line and the inspection signal line connected to another one of the two common electrodes adjacent to each other in the second direction.

15. The display device according to claim 11, wherein a combination of the inspection gate line and the inspection signal line connected to a first common electrode included in the plurality of common electrodes arrayed in the second direction is different from a combination of the inspection gate line and the inspection signal line connected to another common electrode included in the plurality of common electrodes arrayed in the second direction.

16. The display device according to claim 1, wherein the plurality of inspection signal lines are electrically connected to the plurality of common electrodes through the plurality of sensor electrode lines.

* * * * *